United States Patent
Chang et al.

(10) Patent No.: US 9,852,614 B2
(45) Date of Patent: *Dec. 26, 2017

(54) VOICE ENABLED REMOTE CONTROL FOR A SET-TOP BOX

(71) Applicant: Nuance Communications, Inc., Burlington, MA (US)

(72) Inventors: Hisao Chang, Medina, MN (US); Iker Arizmendi, North Bergen, NJ (US)

(73) Assignee: Nuance Communications, Inc., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/819,613

(22) Filed: Aug. 6, 2015

(65) Prior Publication Data

US 2015/0339916 A1 Nov. 26, 2015

Related U.S. Application Data

(63) Continuation of application No. 12/143,525, filed on Jun. 20, 2008, now Pat. No. 9,135,809.

(51) Int. Cl.
*G10L 15/00* (2013.01)
*G08C 17/00* (2006.01)
*G10L 15/26* (2006.01)

(52) U.S. Cl.
CPC ............ *G08C 17/00* (2013.01); *G10L 15/00* (2013.01); *G10L 15/26* (2013.01); *G08C 2201/31* (2013.01)

(58) Field of Classification Search
CPC .... H04S 7/302; H03G 3/301; H04M 2250/74; H04N 2005/4428; H04N 5/4403
USPC ................................. 704/270, 275; 381/104
See application file for complete search history.

(56) References Cited

U.S. PATENT DOCUMENTS

| | | |
|---|---|---|
| 5,937,038 A | 8/1999 | Bell |
| 6,249,757 B1 | 6/2001 | Cason |
| 6,275,164 B1 | 8/2001 | MacConnell et al. |
| 6,285,281 B1 | 9/2001 | Gatto |
| 6,397,388 B1 | 5/2002 | Allen |
| 6,407,779 B1 | 6/2002 | Herz et al. |
| 6,543,052 B1 | 4/2003 | Ogasawara et al. |
| 6,559,866 B2 | 5/2003 | Kolde et al. |
| 6,606,280 B1 | 8/2003 | Knittel |
| 6,889,191 B2 | 5/2005 | Sedacca et al. |
| 7,047,196 B2 | 5/2006 | Calderone et al. |
| 7,086,079 B1 | 8/2006 | Tolkachev et al. |
| 7,096,185 B2 | 8/2006 | Reichardt |
| 7,127,271 B1 | 10/2006 | Fujisaki |
| 7,181,027 B1 * | 2/2007 | Shaffer .................. H04M 9/082 375/346 |
| 7,245,291 B2 | 7/2007 | Sharif |
| 7,260,538 B2 | 8/2007 | Calderone |

(Continued)

*Primary Examiner* — Douglas Godbold
*Assistant Examiner* — Mark Villena

(57) ABSTRACT

A remote control device includes a digital audio storage device, a talk button, and an optical distance measurer. The digital audio storage device is configured to continually record an audio input for a specific amount of time. The talk button is coupled to the digital audio storage device and is configured to initiate a transmission of the audio input to a set-top box device. The optical distance measurer is coupled to the talk button and is configured to automatically measure a distance to a user in response to the talk button being pressed.

20 Claims, 5 Drawing Sheets

(56) References Cited

U.S. PATENT DOCUMENTS

| | | | |
|---|---|---|---|
| 7,321,857 B2 | 1/2008 | Sedacca et al. | |
| 7,345,389 B2 | 3/2008 | Furuki et al. | |
| 7,425,980 B1 | 9/2008 | Harris | |
| 7,644,039 B1 | 1/2010 | Magee et al. | |
| 8,139,791 B1 | 3/2012 | Toosky | |
| 2002/0013813 A1* | 1/2002 | Matsuoka | H04L 12/1813 709/204 |
| 2002/0019732 A1 | 2/2002 | Kikinis et al. | |
| 2002/0046028 A1* | 4/2002 | Saito | G10L 15/1815 704/251 |
| 2002/0069220 A1 | 6/2002 | Tran et al. | |
| 2002/0149705 A1 | 10/2002 | Allen et al. | |
| 2003/0101052 A1* | 5/2003 | Chen | G10L 15/10 704/223 |
| 2003/0139933 A1 | 7/2003 | Kimmel et al. | |
| 2003/0167171 A1* | 9/2003 | Calderone | 704/270 |
| 2004/0071294 A1 | 4/2004 | Halgas, Jr. et al. | |
| 2004/0168187 A1 | 8/2004 | Chang et al. | |
| 2004/0263377 A1 | 12/2004 | Risi et al. | |
| 2004/0264938 A1* | 12/2004 | Felder | G11B 20/10527 386/228 |
| 2005/0033581 A1 | 2/2005 | Foster et al. | |
| 2005/0063556 A1* | 3/2005 | McEachen | H03G 3/30 381/104 |
| 2005/0075885 A1* | 4/2005 | Danieli | A63F 13/12 704/276 |
| 2005/0172319 A1 | 8/2005 | Reichardt et al. | |
| 2006/0048207 A1 | 3/2006 | Martin et al. | |
| 2006/0239471 A1 | 10/2006 | Mao | |
| 2006/0274902 A1* | 12/2006 | Hume | H04S 7/30 381/17 |
| 2007/0061147 A1 | 3/2007 | Monne | |
| 2007/0097936 A1 | 5/2007 | Lee et al. | |
| 2007/0129098 A1* | 6/2007 | Cheng | H04M 1/7258 455/550.1 |
| 2007/0160222 A1* | 7/2007 | Trepte | H04S 7/302 381/61 |
| 2007/0165105 A1 | 7/2007 | Lengeling et al. | |
| 2007/0202858 A1 | 8/2007 | Yu | |
| 2007/0277215 A1 | 11/2007 | Allen | |
| 2007/0280215 A1 | 12/2007 | Gilbert et al. | |
| 2008/0052624 A1* | 2/2008 | Roberts | H04N 5/4403 715/716 |
| 2008/0057893 A1 | 3/2008 | Patla | |
| 2008/0167868 A1 | 7/2008 | Kanevsky | |
| 2008/0260180 A1 | 10/2008 | Goldstein | |
| 2008/0288252 A1 | 11/2008 | Cerra | |
| 2008/0292115 A1 | 11/2008 | Ding | |
| 2008/0292144 A1 | 11/2008 | Kim | |
| 2008/0312934 A1 | 12/2008 | Cerra | |
| 2008/0312935 A1* | 12/2008 | Mau, II | G10L 15/26 704/275 |
| 2009/0006333 A1 | 1/2009 | Jones et al. | |
| 2009/0024703 A1 | 1/2009 | Tamura | |
| 2009/0030681 A1 | 1/2009 | Sureka | |
| 2009/0112592 A1 | 4/2009 | Candelore et al. | |

* cited by examiner

VOICE ENABLED REMOTE CONTROL FOR A SET-TOP BOX

CROSS-REFERENCE TO RELATED APPLICATIONS

This application is a continuation of and claims priority to U.S. patent application Ser. No. 12/143,525, filed Jun. 20, 2008. The contents of each of the foregoing is/are hereby incorporated by reference into this application as if set forth herein in full.

FIELD OF THE DISCLOSURE

The present disclosure generally relates to communications networks, and more particularly relates to a remote control device for a set-top box.

BACKGROUND

Remote controls are common for set-top box devices, televisions, digital video disc (DVD) players, and the like. Some remote controls, known as universal remote controls, can be programmed to function with multiple target devices. In most cases, remote controls send an infrared (IR) control signal via an IR transmitter. The target device uses the IR control signal to determine what command function the user is requesting.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
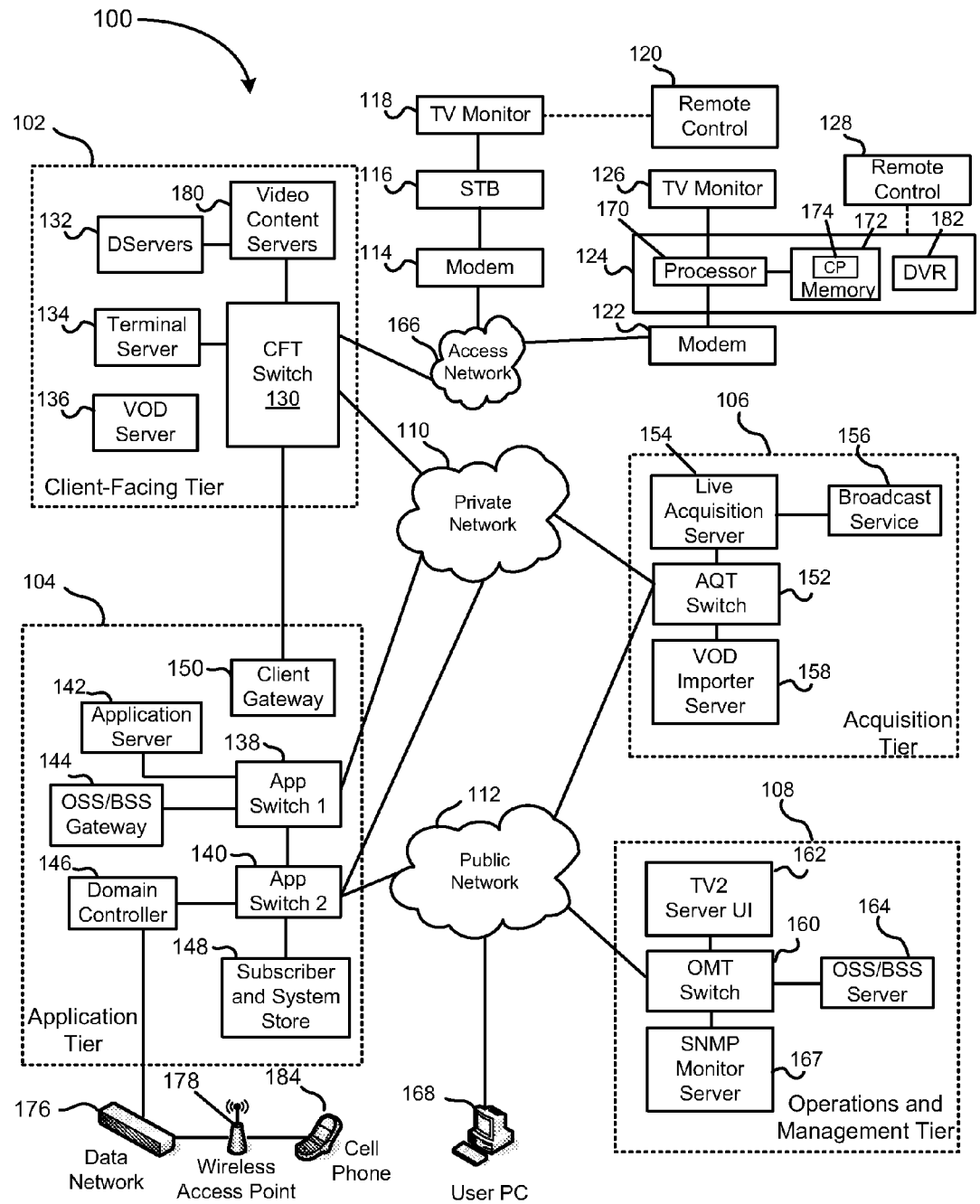
FIG. 1 is a block diagram illustrating an Internet Protocol Television (IPTV) network.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. The set-top box devices 116 and 124 can process data received from the private access network 166 via an IPTV software platform such as Microsoft™ TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VoD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VoD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the first set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VoD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VoD importer server 158 can receive content from one or more VoD sources outside the IPTV system 100, such as movie studios and programmers of non-live content. The VoD importer server 158 can transmit the VoD content to the AQT switch 152, and the AQT switch 152 in turn can communicate the material to the CFT switch 130 via the private network 110. The VoD content can be stored at one or more servers, such as the VoD server 136.

When a user issues a request for VoD content to the set-top box device 116 or 124, the request can be transmitted over the private access network 166 to the VoD server 136 via the CFT switch 130. Upon receiving such a request, the VoD server 136 can retrieve requested VoD content and transmit the content to the first set-top box device 116 or to the second set-top box device 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, set-top box devices 116 and 124 can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The set-top box computer program 174 can contain instructions to receive many types of user preferences from the domain controller 146 via the access network 166. For example, the set-top box computer program 174 can include instructions to receive a request to record at least one television program at a video content storage module such as a digital video recorder (DVR) 182 within the second set-top box device 124. In this example embodiment, the set-top box computer program 174 can include instructions to transmit the request to the DVR 182, where the television program(s) are recorded. In an illustrative embodiment, the set-top box computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
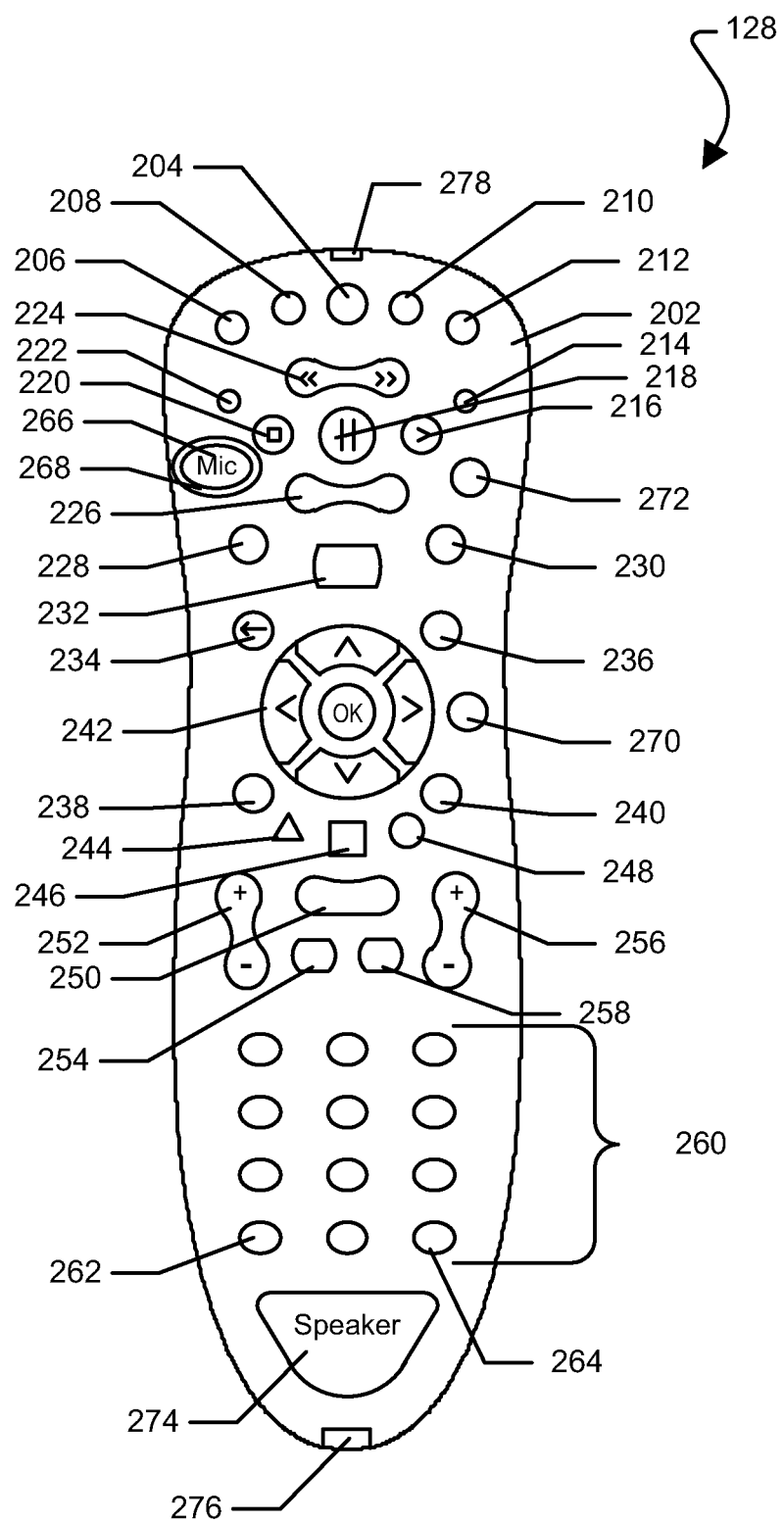
FIG. 2 is a plan view of a remote control device.

FIG. 2 shows the remote control device 128 including a housing 202 having a plurality of buttons. For example, the remote control device 128 can include a power button 204, an IPTV button 206, a television (TV) button 208, a digital video disc (DVD) button 210, and an auxiliary (AUX) button 212. When the IPTV button 206 is pressed, the remote control device 128 can be used to control the second set-top box device 124. When the TV button 208 is pressed, the remote control device 206 can be used to control the display device 126 connected to the second set-top box device 124. When the DVD button 210 is pressed, the remote control device 128 can be used to control a DVD player connected to the display device 126 or to the second set-top box device 124. Additionally, when the AUX button 212 is pressed, the remote control device 128 can be used to control an auxiliary device connected to the display device 126 or to the second set-top box device 124. For example, the auxiliary device can be a compact disc (CD) player, a video cassette recorder (VCR), an audio receiver, or some other home entertainment device.

The remote control device 128 can include a TV/VIDEO button 214 that can be used to toggle between inputs for display, such as between television content and video content from the DVR or the DVD player. The remote control device 128 can also include a PLAY button 216, a PAUSE button 218, a STOP button 220, a RECORD button 222, a rewind (REW)/fast forward (FF) button 224, and a replay/slow forward (FWD) button 226. These buttons can be used to control the content received at the second set-top box device 124 or video content received from a DVD player. One or more of these buttons can also be programmed to control the CD player, the VCR, or some other home entertainment device. The remote control device 128 can also include a VIDEO ON DEMAND button 228 and a RECORDED TV button 230. The VIDEO ON DEMAND button 228 can be pressed in order to access VoD content available via the second set-top box device 124. The RECORDED TV button 230 can be pressed in order to access television content recorded at the second set-top box device 124.

The remote control device 128 can also include a MENU button 232, a BACK button 234, a GO INTERACTIVE button 236, an EXIT button 238, and an INFO button 240. The MENU button 232 can be used to access a menu of features provided by the second set-top box device 124. Further, the INFO button 244 can be used to access an information window provided by the second set-top box device 124. The GO INTERACTIVE button 236 can be used to access interactive content provided by the IPTV system. The remote control device 128 can include a directional keypad 242. The directional keypad 242, the BACK button 234, and the EXIT button 238 can be used to navigate within the various content windows provided by the second set-top box device 124. The remote control device 128 can also include a triangular A button 244, a square B button 246, and a round C button 248. The A button 244, the B button 246, and the C button 248 can be used to make various selections when navigating within a menu screen, an information screen, or some other screen provided by the second set-top box device 124.

The remote control device 128 can further include a GUIDE button 250 that can be pressed in order to access an electronic programming guide for the content provided by the second set-top box device 124. Moreover, the remote control device 128 can include a volume (VOL) up/down button 252, a MUTE button 254, a channel/page (CH/PG) up/down button 256, and a LAST button 258. The VOL button 252 can be used to control the volume of the second set-top box device 124, a TV, a CD player, etc. The MUTE button 254 can be used to mute audio content provided by the second set-top box device 124, a TV, a CD player, etc. The CH/PG button 256 can be used to change the channel at the second set-top box device 124 or navigate from page-to-page within a content guide provided by the set-top box device. The LAST button 258 can be used to return to the last channel viewed by the user at the second set-top box device 124.

The remote control device 128 can include a numerical keypad 260 having a plurality of buttons that are individually numbered 1, 2, 3, 4, 5, 6, 7, 8, 9, and 0. The numerical keypad 260 is configured similar to a telephone keypad and each individual button also includes a portion of the alphabet. The 2 button includes ABC, the 3 button includes DEF, the 4 button includes GHI, the 5 button includes JKL, the 6 button includes MNO, the 7 button includes PQRS, the 8 button includes TUV, and the 9 button includes WXYZ. The 0 button can also be used as a SPACE button. In a particular embodiment, the numerical keypad 260 can be used to input a specific channel number. Further, the numerical keypad 260 can be used to input text to the IPTV system, when necessary, using the triple tap method well known in the art. The numerical keypad 260 can also include a DELETE button 262 and an ENTER/ZOOM button 264.

The remote control device 128 can also include a microphone 266, a light emitting diode (LED) annulus 268, a talk button 270, an optical distance measurer 272, a speaker 274, an audio output 276, and an infrared (IR) transmitter 278. Further details of the remote control device 128 are described in U.S. patent application Ser. No. 11/847,120, the disclosure of which is hereby incorporated by reference.

Figure 3:
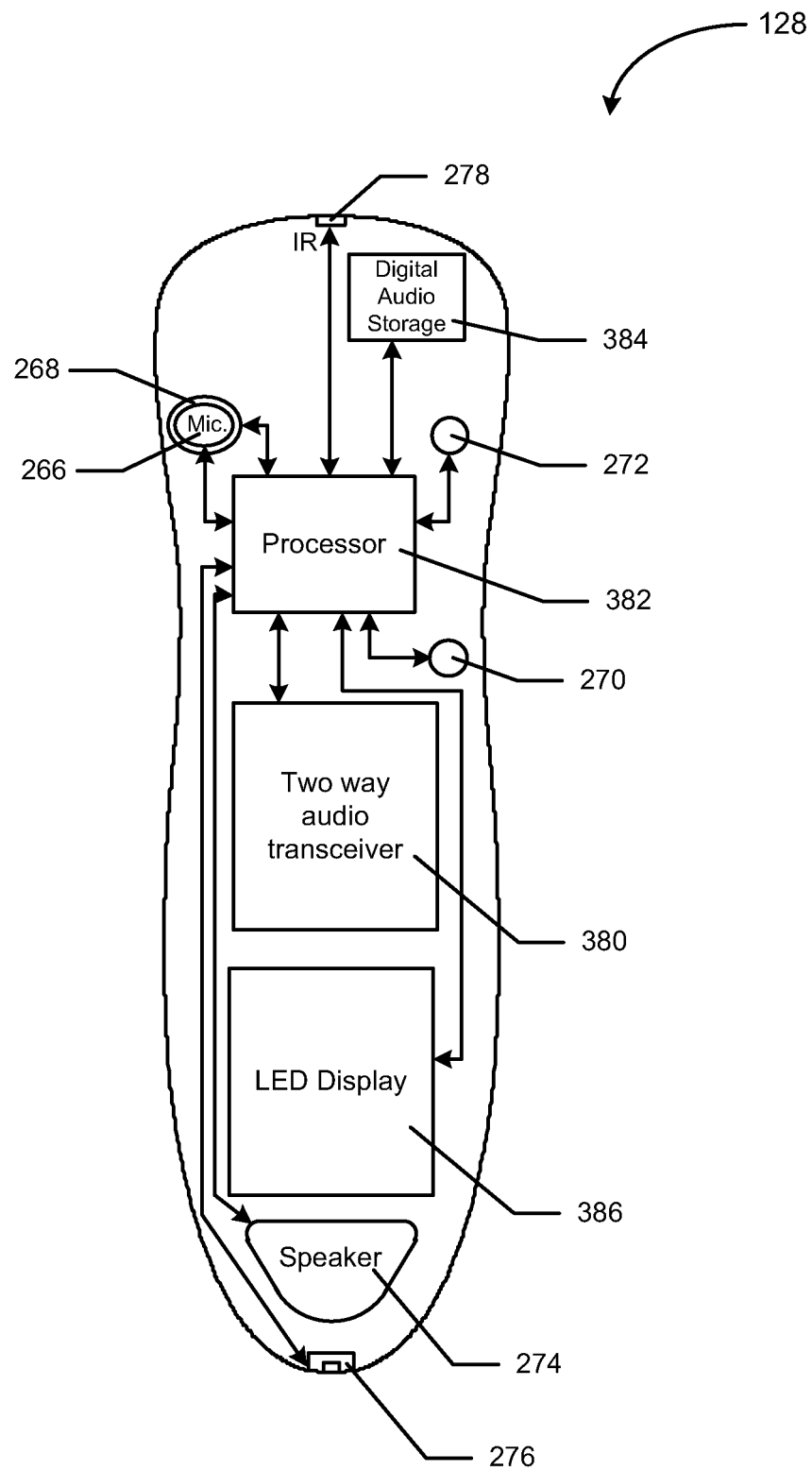
FIG. 3 is a block diagram of a plurality of components in the remote control device.

FIG. 3 shows a block diagram of a number of components in the remote control device 128 including a two-way audio transceiver 380, a processor 382, a digital audio storage 384, and a LED display 386. The microphone 266 is coupled to the digital audio storage 384 through the processor 382. The LED annulus 268 is coupled to the talk button 270 and the two-way audio transceiver 380. The talk button 270 is coupled to the two-way audio transceiver 380 and the digital audio storage 384. The optical distance measurer 272 is coupled to the two-way audio transceiver 380. The speaker 274 is coupled to the two-way audio transceiver 380. The audio output 276 is coupled to the two-way audio transceiver 380. The IR transmitter 278 is in communication with the processor 382. The two-way audio transceiver 380 is in communication with the processor 382. The digital audio storage 384 is in communication with the processor 382. The LED display 386 is in communication with the processor 382.

The microphone 266 can be used to receive an audio input from the user of the remote control device 128. Upon the talk button 270 being pressed, the remote control device can transmit the audio input to the second set-top box device 124. The LED annulus 268 can light-up, indicating that the talk button 270 has been pressed and the remote control device 128 is transmitting the audio input to the second set-top box device 124. The optical distance measurer 272 can determine a distance that the user is from the remote control device 128, such as by transmitting a reflective optical beam from the remote control device. The speaker 274 can output a digital audio signal received by the remote control device 128 from the second set-top box device 124. The audio output 276 can output, to an external audio device (not shown), the digital audio signal received by the remote control device 128 from the second set-top box device 124. The IR transmitter 278 can transmit IR control signals to the auxiliary devices. The IR control signals can be used to perform various functions on any of the auxiliary devices, such as changing the channel, changing the volume level, and the like on the second set-top box device 124.

Whenever any button is pressed on the remote control device 128, such as channel up/down buttons 256 of FIG. 2, the digital audio storage 384 activates and records an audio input received at the microphone 266. The audio input is stored in a local audio circular buffer of the digital audio storage 384 for a predetermined amount of time. The predetermined amount of time can be any length of time, for example five seconds. Additionally, upon a button being pressed on the remote control device 128, the two-way audio transceiver 380 activates such that the audio input can be transmitted to the second set-top box device 124. The two-way audio transceiver 380 can alternatively be placed in a sleep mode to conserve battery life if no button is pressed for a predetermined period, such as fifteen seconds. Upon the talk button 270 being pressed, the remote control device 128 can execute a number of functions at substantially the same time. The remote control device 128 can set the recording mode to "start," light-up the LED annulus 268, activate the audio digital storage 384, activate the two-way audio transceiver 380, and trigger the optical distance measurer 272 to determine a distance between the remote control device 128 and the user's face.

When the recording mode is set to "start," the remote control device 128 can send the last audio input stored in the local audio circular buffer of the digital audio storage 384 to the second set-top box device 124. At substantially the same time, the remote control device 128 can send a control parameter embedded in a radio frequency (RF) control signal to the second set-top box device 124. The control parameter can contain the distance measurement determined by the optical distance measurer 272, such as four and one-half inches. Based on the control parameter associated with the distance measurement received from the remote control device 128, the second set-top box device 124 can automatically adjust level of audio amplification for the audio input received. The adjustment level of the audio amplification can compensate for a variability that the user's mouth is too far away from the microphone 266 or too close to it. Finally, the remote control device can change the recording mode to "on."

When the recording mode is "on," the microphone 266 can continue to receive the audio input and the two-way audio transceiver 380 can send it as a digital audio stream to the second set-top box device 124. Upon receiving the digital audio stream, the second set-top box device 124 can stream the digitized audio packets to the multimedia application server 142 over the private network 110 of FIG. 1. The multimedia application server 142 can process the speech input and/or pass it in real time to a voice search engine, where the audio input can be used to perform a voice search for a specific television program. Upon receiving the end of the audio input, the multimedia application server 142 can send a control message to the second set-top box device 124 indicating the end of a speech input session.

Upon receiving the end of speech input from multimedia application server 142, the second set-top box device 124 can present a visual icon on the display device 126 of FIG. 1, such as displaying a muted microphone icon, indicating that the end of the speech input is reached. At substantially the same time, the second set-top box device 124 can send an RF control signal to the remote control device 128 indicating the end of the speech input. Upon receiving the RF control signal from the second set-top box device 124, the remote control device 128 can change the recording mode from "on" to "off." Additionally, the remote control device 128 can set the recording mode to "off" if a predetermined amount of time, such as two seconds, elapses after talk button 270 has been released and the audio input level is below a predetermined level. When the recording mode is changed from "on" to "off," the remote control device 128 can turn off the LED annulus 268, and set the microphone 266 and two-way audio transceiver 380 to sleep modes to conserve the battery.

The multimedia application server 142 can also send a control message to the second set-top box device 124, requesting that the set-top box device send a variety of RF-based control signals to the remote control device 128. For example, one control signal can cause the remote control device 128 to play a short audio file stored on the digital audio storage 384 through the speaker 274. This feature can enable the user to locate the remote control device 128 if it is missing. Another control signal can cause the remote control device 128 to turn off the LED annulus 268 and to end transmission of the audio input. The multimedia application server 142 can also send a "play list" to the remote control device 128 via the second set-top box device 124. The play list can contain a set of channel numbers, which can be stored on the remote control device 128. This feature can be used to select a number of "favorite" broadcast channels by scrolling the list stored on the remote control device 128 via the LED display 386.

Also, the second set-top box device 124 can automatically scan the RF band over which the remote control device 128 is operating, such as two and two-fifths GHz. If there is any RF interference from other RF devices in a surrounding area, the second set-top box device 124 can automatically choose an RF channel with less interference and then send a control signal to the remote control device 128. The control signal can request that the remote control device re-synchronize the signal band with the set-top box device 124.

Figure 4:
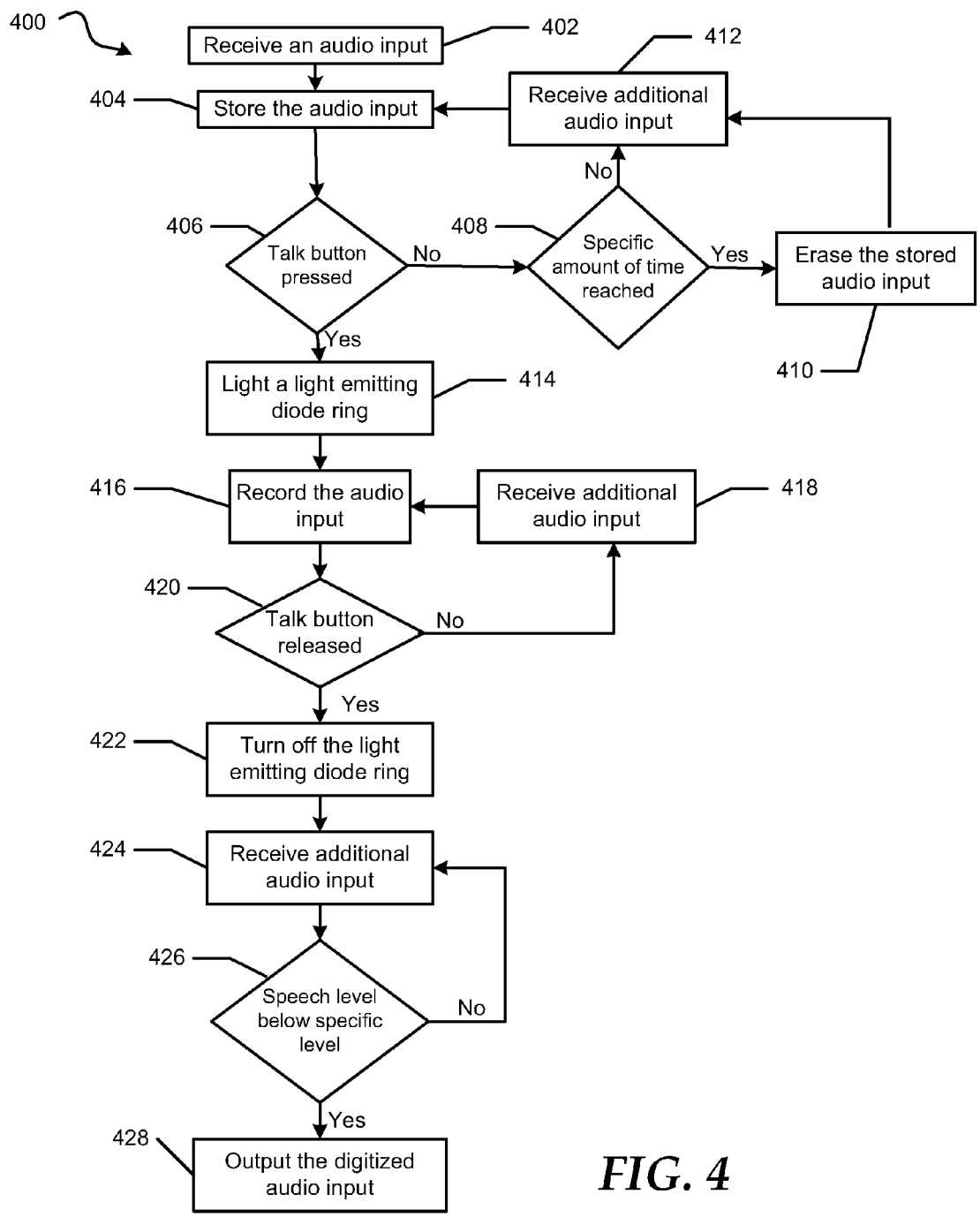
FIG. 4 is a flow diagram of a method for outputting a voice command to a set-top box device.

The remote control device 128 can be used to transmit a voice command to the second set-top box device 124. FIG. 4 shows a flow diagram of a method 400 for outputting a voice command to the set-top box device. At block 402, an audio input is received at a remote control device. The audio input is stored in a digital audio storage device at block 404. At block 406, determination is made whether a talk button is pressed and held. If the talk button is not pressed, then a determination is made whether a specific amount of time passes at block 408. The specific amount of time is measured from the first audio input received. At block 410, if the specific amount of time lapses, then the audio input stored in the digital audio storage device is erased. An additional audio input is received at block 412 and the flow diagram continues at block 404. If the specific amount of time has not passed, then an additional audio input is received at block 412 and the flow diagram continues at block 404.

If the talk button is pressed, then an LED annulus is turned on at block 414. At block 416, the audio input is recorded. A determination is made whether the talk button is released at block 420. If the talk button is not released, an additional audio input is received at block 418 and the flow diagram continues at block 416. At block 422, if the talk button is released, the LED annulus is turned off. Additional audio input is received at block 424. At block 426, a determination is made whether a volume of the speech received at the microphone is below a specific level. If the volume of speech is not below the specific level, then the audio input is continually received at block 424. If the volume of speech is below the specific level, then the audio input is outputted as a voice command at block 428. The voice command can be outputted to a set-top box device to perform a function associated with the voice command.

Figure 5:
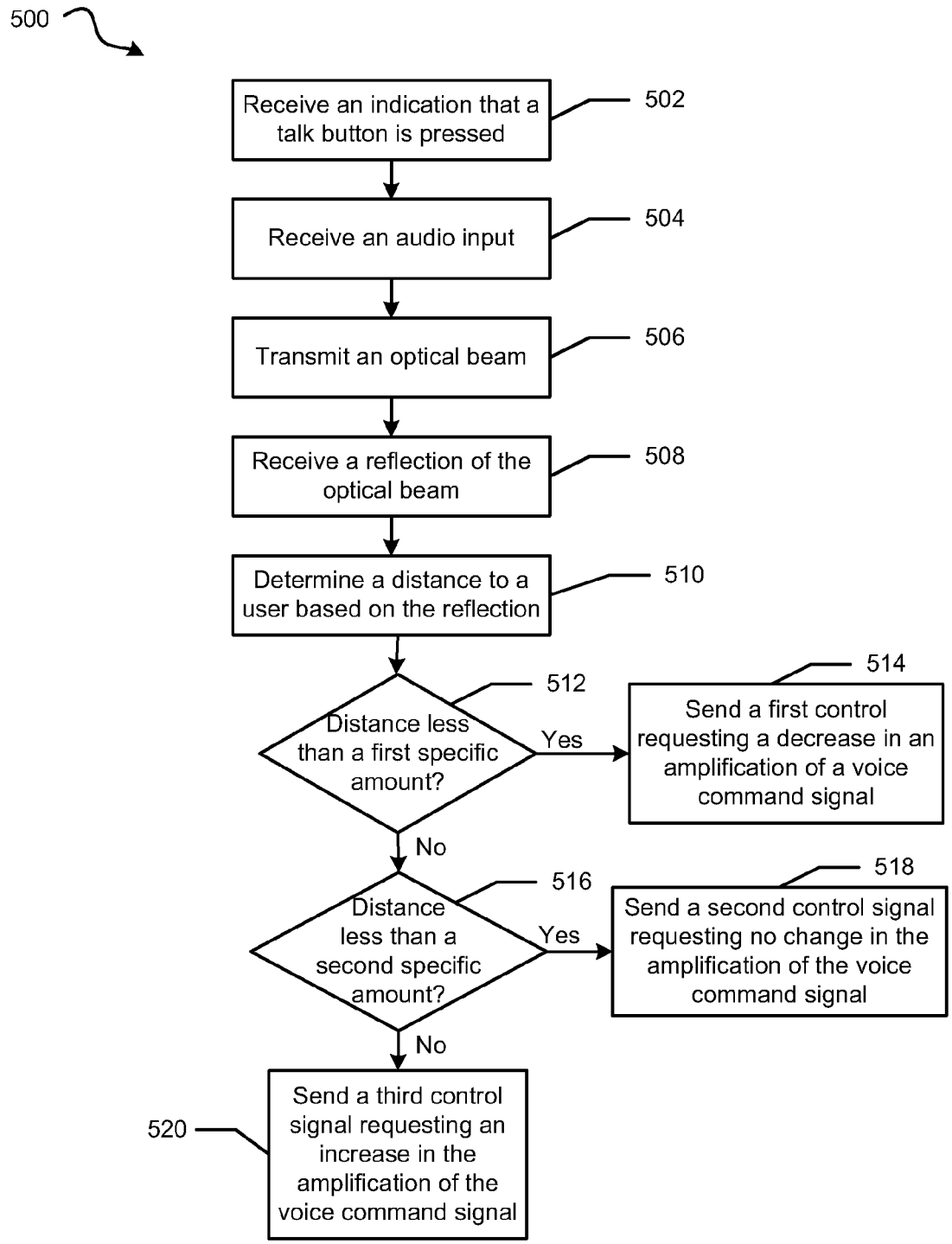
FIG. 5 is a flow diagram of a method for varying an amplification of a voice command from the remote control device.

The remote control device 128 can also be used to transmit a control parameter, for varying an amplification of a voice command signal, to the set-top box. FIG. 5 shows a flow diagram of a method 500 for varying the amplification of the voice command signal from the remote control device. At block 502, an indication that a talk button has been pressed is received. An audio input is received at block 504. At block 506, an optical beam is transmitted. A reflection of the optical beam is received at block 508. At block 510, a distance to a user is determined based on the reflection of the optical beam received. A determination is made whether the distance to the user is less than a first specific amount at block 512. If the distance is less than the specific amount, then a first control signal requesting a decrease in the amplification of the voice command signal is sent to the set-top box device at block 514. If the distance is not less than the first specific amount, then a determination is made whether the distance is less than a second specific amount at block 516. If the distance is less than the second specific amount, then a second control signal requesting no change in the amplification of the voice command signal sent to the set-top box device at block 518. If the distance is not less than the second specific level, then a third control signal requesting an increase in the amplification of the voice command signal is sent to the set-top box device at block 520.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A remote control device, comprising:
   a processing system including a processor; and
   a memory that stores executable instructions that, when executed by the processing system, facilitate performance of operations, comprising:
   receiving audio input from a user responsive to detecting user input;
   measuring a distance to the user to generate an audio threshold;
   performing voice recognition on the audio input to determine a command function while the audio input satisfies the audio threshold;
   monitoring a volume level of the audio input to detect when the volume level falls below the audio threshold;
   measuring a length of time after the volume level falls below the audio threshold;
   determining if a command indicator input has been received from the user within a predetermined length of time after the volume level falls below the audio threshold; and
   transmitting the command function to a media device responsive to detecting the volume level falling below the audio threshold and responsive to a determination that the command indicator input has been received within the predetermined length of time.

2. The remote control device of claim 1, wherein the operations further comprise continuously recording the audio input over a predetermined amount of time.

3. The remote control device of claim 1, further comprising a two-way digital audio transmitter to perform the transmitting.

4. The remote control device of claim 3, further comprising a speaker, wherein the speaker outputs digital audio signals received from the media device through the two-way digital audio transmitter.

5. The remote control device of claim 3, further comprising an audio output connected to the two-way digital audio transmitter, the audio output configured to output digital audio signals received from the media device to an external audio output device.

6. The remote control device of claim 1, wherein the command indicator input is detected upon a talk button being pressed.

7. The remote control device of claim 1, wherein the distance is transmitted to the media device to indicate a modified amplification level of the command function, and
   wherein the distance is compared to a threshold distance to determine the modified amplification level.

8. The remote control device of claim 1, further comprising:
   a microphone to receive the audio input; and
   a light emitting diode associated with the microphone, the light emitting diode being lit in response to the user input being detected,
   wherein the audio threshold is a volume level.

9. The remote control device of claim 8, wherein, upon the user input ceases, the light emitting diode ceases being lit, and wherein additional audio input is recorded until the volume level falls below the threshold.

10. A method, the method comprising:
    obtaining, by a media control device comprising a processor, an audio input;
    measuring, by the media control device, a distance to a user providing the audio input as a measured distance to generate a threshold;
    detecting, by the media control device, when the audio input has ceased by comparing the audio input to the threshold;
    measuring, by the media control device, a length of time after a volume level of the audio input falls below an audio threshold;
    determining, by the media control device, if a command indicator input has been received from the user after the volume level falls below the audio threshold; and
    providing, by the media control device, the audio input to a media device being controlled by the media control device to perform voice recognition on the audio input to determine a command function for controlling operations of the media device responsive to detecting the audio input has ceased and responsive to a determination that the command indicator input has been received.

11. The method of claim 10, further comprising continuously recording the audio input over a predetermined amount of time after the command indicator input has ceased.

12. The method of claim 10, further comprising automatically transmitting the command function after the command indicator input has ceased.

13. The method of claim 10, wherein the measured distance is transmitted to the media device to indicate a modified amplification level of the command function, and wherein the measured distance is compared to a threshold distance to determine the modified amplification level.

14. The method of claim 10, further comprising activating a light emitting diode responsive to the command indicator input, and wherein the command indicator input is detected upon a talk button being pressed.

15. The method of claim 14, further comprising, responsive to the command indicator input ceasing, ceasing the activation of the light emitting diode, and wherein additional audio input is recorded until the volume level falls below the audio threshold.

16. A non-transitory machine-readable storage medium, comprising executable instructions that, when executed by a processing system including a processor, facilitate performance of operations, comprising:
    receiving an audio input;
    measuring a distance to a user providing the audio input to determine a threshold for detecting when the user ceases to provide the audio input;
    detecting, according to the threshold, that the audio input has ceased to be provided by the user;
    measuring a length of time after the audio input falls below the threshold;
    determining if a command indicator input has been received from the user within a predetermined length of time after the audio input falls below the threshold;
    performing voice recognition on the audio input to determine a command function for controlling a media device responsive to the detecting that the audio input has ceased to be provided by the user; and
    transmitting the command function to the media device responsive to the detecting that the audio input has ceased to be provided by the user and responsive to a determination that the command indicator input has been received within the predetermined length of time.

17. The non-transitory machine-readable storage medium of claim 16, wherein the transmitting is performed by a two-way digital audio transmitter, and wherein the command indicator input is detected upon a talk button being pressed.

18. The non-transitory machine-readable storage medium of claim 17, wherein operations further comprise outputting digital audio signals received from the media device through the two-way digital audio transmitter.

19. The non-transitory machine-readable storage medium of claim 16, wherein the distance is compared to a threshold distance to determine a modified amplification level.

20. The non-transitory machine-readable storage medium of claim 16, wherein the operations further comprise providing an indication that the input command has been received and has not ceased.

* * * * *